United States Patent Office 2,964,426
Patented Dec. 13, 1960

2,964,426

PROCESS OF IMPREGNATING PAPER TO FORM LAMINATED MATERIAL

Ulrich Holtschmidt, Essen-Heisingen, Germany, assignor to Th. Goldschmidt A.G., Essen, Germany, a company of Germany No Drawing. Filed Nov. 20, 1958, Ser. No. 775,105

4 Claims. (Cl. 117—155)

This invention generally pertains to a novel method for impregnating decorative sheets with melamine-formaldehyde resins so that the resin impregnated decorative sheets can be used as a surfacing material either alone or in conjunction with other materials.

The steps of present invention can be generally illustrated by the following flow sheet.

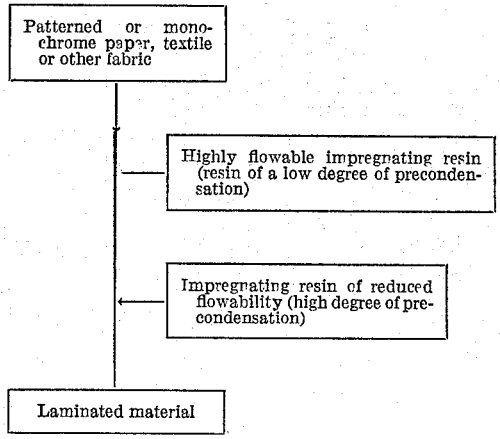

SUMMARY OF PRIOR ART AND ITS DISADVANTAGES

It is known that patterned or decorative sheets of paper, textile or other fabric can be impregnated with various hardenable aminoplast resins, especially melamine-formaldehyde resins, and that after these resin-impregnated sheets have been dried and pre-condensed they can be applied with the aid of pressure and heat to a variety of thicker and stronger foundation materials such as phenoplastic laminates, fibreboard, pressboard, plywood, and similar material.

One such procedure, sometimes referred to as the "overlay" method, involves first impregnating the surface of a printed decorative sheet by passing it through a solution of impregnating resin, then removing the surplus solution of resin with scrapers, squeeze rollers, or other metering devices, and thereafter drying the resin-impregnated sheet. Since the film of resin thus produced on the decorative sheet is usually insufficient to produce a surface of satisfactory appearance, a thin unpigmented "overlay" paper is usually simultaneously produced in the same way as the decorative sheet with the exception that it is provided with a surplus content of resin. This resin-impregnated unpigmented paper is then superimposed on the resin-impregnated decorative sheet and this combination is pressed onto the foundation material in a single operation, thus forming an overlay. The desired flow properties of the impregnating synthetic resin employed in both the decorative sheet and the unpigmented "overlay" paper can be controlled as required by adding flow-promoting or flow inhibiting materials (hardeners) to the resin, so that the flowabilities of the resin in the decorative sheet and the resin in the unpigmented overlay sheet can be differentially adjusted.

Another known method, sometimes referred to as the "double impregnation method" involves providing the decorative sheet with the surplus impregnating resin required to produce a satisfactory appearance of the finished product by passing the decorative sheet through the impregnating resin solution a second time instead of by providing an overlay. The first resin impregnation of the decorative sheet corresponds to the normal impregnation of the "overlay" method, whereas the second resin impregnation, which is generally performed after the resin-impregnated decorative sheet has been intermediately dried, provides an additional layer of resin applied to the surface of the decorative sheet material.

Despite the advantages offered by the "double impregnation method" over the "overlay" process (overlay papers are very expensive, their transparency is frequently not entirely satisfactory, the purity of their color is often adversely affected, and the processing of the very thin overlay sheets often presents considerable difficulties) the described "double impregnation method" also suffers from a number of grave disadvantages, especially giving rise to a dull patchy appearance.

OBJECTS

It is therefore an object of this invention to provide a method for impregnating decorative sheets with resin in such a manner that when the impregnated product is subsequently dried and cured there will be no clouding, undesirable softening or dull patchy areas and the impregnated decorative sheets can be used as a surfacing material either alone or in conjunction with other materials.

Other objects of this invention will appear in the following description, examples and claims.

THE INVENTION BROADLY

In accordance with this invention, it has been discovered that it is possible to successively impregnate a sheet of decorative material with two different types of a melamine-formaldehyde resin so that the resulting impregnated decorative sheet will have a composite resin film which is particularly suitable for pressing due to the fact that the "first" and "second" portions of the composite resin film have *different* flowability and hardenability properties. More particularly, it has been discovered that the "first" portion of the composite resin film should be made to possess *high flowability* and low hardenability properties whereas the "second" portion of the composite resin should have *reduced flowability* and rapid hardening properties. The "first" portion of the composite resin film is intended to be that portion of the composite resin film which is closest to the foundation material after bonding.

CONTROLLING THE FLOWABILITY OF THE IMPREGNATING RESINS

The desired flowabilities of the "first" and "second" resins can be controlled and adjusted by any one of several methods that are familiar to those skilled in the melamine-formaldehyde resin art. It is recognized that the terms "high flowability" and "low flowability" are somewhat relative terms but it is believed that these terms constitute a sufficient guide for those skilled in this art to enable them to practice the invention and to achieve the unexpected results herein set forth. It is not practicable to specify absolute numerical ranges or limits for the terms "high flowability" and "low flowability" due to the fact that there are (a) so many different types of decorative materials which might be employed, (b) so many different types of foundation materials, and (c) so many different conditions under which the impregnated resins could be applied, dried, condensed and bonded.

However, by way of illustration the high flowability of the "first" impregnating resin may be produced either (a) by a very low degree of pre-condensation of the impregnating resin or (b) by the addition of buffer substances which retard the hardening process, such as alkali metal borates, alkali metal phosphates, guanidine salts of weak acids and similar substances, or (c) by incorporating into the resin plasticisers such as toluene sulphonamides, alkyl or aryl guanamines, and the like. Reduced flowability and rapid hardening of the "second" impregnating resin can be achieved (a) by a high degree of precondensation of the liquid resin or (b) by the addition of the customary latent hot hardeners for melamine-formaldehyde resins, such as ammonium or amine salts of weak to strong acids, e.g. ethylene diamine acetate, ammonium lactate, ammonium rhodanide and ethylene aminophosphate, or of other substances which liberate acids under heat, such as sodium chloroacetate or pronounced chelate-forming reticulators such as aluminum acetate and the like.

ADVANTAGES OF THIS INVENTION

Decorative surface sheets impregnated as hereinbefore described will require no further aids such as an overlay, foundation film, or the like. Their second coating renders them self-adhesive on every suitable foundation material and their surfaces are of excellent quality. The aforedescribed defects which otherwise arise in twice impregnated strongly pigmented decorative sheets produced by the earlier method do not arise when the present invention is followed.

The effect achieved by the invention is all the more surprising in that it would not ordinarily be expected that in a layer which is as thin as that represented by a resin-impregnated decorative surface sheet it would be possible for an apparently fully homogeneous synthetic resin to actually have two entirely different flow properties in different strata.

EXAMPLES

The following examples are illustrative of preferred procedures for carrying out the present invention. It should be understood that these examples are not intended to limit the invention and that obvious changes may be made by those skilled in the art without changing the essential characteristics and the basic concept of the invention. The parts and percentages are by weight unless otherwise specified.

EXAMPLE 1

A printed high-quality cellulose decorative paper having a high content of alpha-cellulose and a weight of about 150 g./sq. m., was conducted through a first resin impregnating bath consisting of a 50% aqueous solution of a melamine-formaldehyde resin of a low degree of precondensation, produced in a known manner from melamine and formaldehyde in a mol ratio of 1:2.5 with the subsequent admixture of about 0.15 wt. percent of tertiary sodium phosphate (based on the weight of the entire solution). The surplus of the first resin was removed so that the weight of the resin impregnated paper, after having been dried in a conventional manner (150–260° F.) by hot air, amounted to about 290 g./sq. m. this impregnated paper was then taken through a 50% aqueous solution of a melamine-formaldehyde resin also having a mol ratio of 1:2.5 but being more highly condensed and with an admixture of 0.3 wt. percent (based on the weight of the entire solution) of ethylene diamine phosphate, quantitatively controlled by roller application, in such a manner that the final weight of the finished resin impregnated sheet, after having been dried at 150–260° F. was about 330–340 g./sq. m. The resultant doubly impregnated sheet had the outstanding qualities that have been hereinabove described. The resultant sheet was easily bonded to a plywood foundation core by using 350 p.s.i. and a temperature of 150° C. for about 12 minutes, thereby producing an excellent laminated product useful for tabletops, etc.

EXAMPLE 2

The same type of decoratice paper as was described in Example 1 was treated in substantially the same manner described in Example 1, by preliminarily impregnating with a 50% aqueous solution of melamine-formaldehyde resin in an amount so that the dry weight of the impregnated paper would be between about 300 and 310 g./sq. m. This said first impregnating resin had a low degree of precondensation and was melamine-formaldehyde resin having a mol ratio of 1:2.5 and it contained 7% of a mixture of o- and p-toluene sulphonamide as plasticisers. The first resin film was dried in a conventional manner (150–260° F.) with hot air. The second resin impregnation was performed with the same type of a melamine-formaldehyde resin with the exception that it had a content of about 0.2% aluminum acetate instead of a plasticiser. The final weight of the resin impregnated sheet after further drying at 150–260° F. was between about 340 and 360 g./sq. m. This process produced especially good resin impregnated decorative monochrome sheets. The impregnated decorative sheet was easily bonded to a phenoplastic laminate foundation using the aid of elevated temperatures and pressures.

MISCELLANEOUS

The impregnated decorative sheets of this invention may be bonded to a solid or laminated core in any well-known manner. For example, the decorative sheet can be bonded to fibreboard by applying a pressure of about 25 kg./cm.$^2$ for 10 minutes at a temperature of about 150° C. The resulting fibreboard is thereby coated with a brilliant decorative film. The core may be a laminate made from a plurality of paper plies bonded with a thermosetting resin, such as an alkyd resin or a phenolic resin; or the core may be either a solid block of wood or the hardboard material which comprises woodwaste bonded with a thermosetting resin under high pressure. The decorative sheet may consist of paper, various textile materials such as cotton, glass, nylon, vinyl resin, etc., or fabric.

The terms utilized in the foregoing specification are to be for description purposes and are intended to be broadly construed; consequently, no unnecessary limitations are to be implied from such terms beyond the requirements of the prior art. Unless otherwise indicated the various terms in this specification may be considered as having the meaning set forth in the latest edition of Hackh's Chemical Dictionary.

What is claimed is:

1. A novel method for producing laminated material which comprises:

(a) impregnating a thin sheet of decorative material selected from the group consisting of paper and fabric with a first melamine-formaldehyde resin material.

(b) removing any excess amounts of said first resin and at least partially drying said impregnated thin sheet of decorative material.

(c) further coating said impregnated thin sheet of decorative material with a second melamine-formaldehyde resin material.

(d) at least partially drying said impregnated and coated thin sheet of decorative material, and (e) said first melamine-formaldehyde resin material having higher flowability properties than said second melamine-formaldehyde resin material during susbequent pressing operations.

2. A method according to claim 1 wherein said first melamine-formaldehyde resin material contains buffer substances which retard the hardening of the resin.

3. The method according to claim 1 wherein said second melamine-formaldehyde resin material contains latent hot hardeners for melamine-formaldehyde resin materials.

4. The method according to claim 1 wherein said decorative material is paper.

References Cited in the file of this patent
UNITED STATES PATENTS

| | | |
|---|---|---|
| 602,797 | Annison | Apr. 19, 1898 |
| 1,439,743 | Mathes | Dec. 26, 1922 |
| 1,857,690 | Mellanoff | May 10, 1932 |
| 2,380,239 | Howald | July 10, 1945 |
| 2,424,284 | Olpin | July 22, 1947 |
| 2,630,395 | McCullough et al. | Mar. 3, 1953 |
| 2,930,106 | Wrotnowski | Mar. 29, 1960 |